(12) United States Patent
Powers et al.

(10) Patent No.: US 7,840,563 B2
(45) Date of Patent: Nov. 23, 2010

(54) COLLECTIVE RANKING OF DIGITAL CONTENT

(75) Inventors: Michael Powers, San Francisco, CA (US); Vijay Karunamurthy, San Francisco, CA (US); Ches Wajda, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 371 days.

(21) Appl. No.: 12/024,940

(22) Filed: Feb. 1, 2008

(65) Prior Publication Data

US 2008/0189272 A1 Aug. 7, 2008

Related U.S. Application Data

(60) Provisional application No. 60/888,084, filed on Feb. 3, 2007.

(51) Int. Cl.
G06F 17/30 (2006.01)
(52) U.S. Cl. ...................................... 707/736
(58) Field of Classification Search ...................... 707/2, 707/5, 736; 345/751
See application file for complete search history.

(56) References Cited

U.S. PATENT DOCUMENTS

| | | | |
|---|---|---|---|
| 2002/0194607 A1 | 12/2002 | Connelly | |
| 2003/0227478 A1* | 12/2003 | Chatfield | 345/751 |
| 2008/0189147 A1* | 8/2008 | Bartlett | 705/6 |

OTHER PUBLICATIONS

PCT International Search Report and Written Opinion, PCT/US 08/52935, Jul. 23, 2008, 7 Pages.

* cited by examiner

*Primary Examiner*—Etienne P LeRoux
(74) *Attorney, Agent, or Firm*—Fenwick & West LLP (57) ABSTRACT

Methods and systems for collaboratively ranking a set of digital content items are disclosed. The invention utilizes users of a website who wish to participate in ranking a set of digital content items. In one embodiment, the method to determine a new collaborative ranking of a set of digital content items comprises receiving a plurality of ranking votes for each digital content item in the set, tallying the received user ranking votes for each digital content item in the set, calculate a ranking score by applying an algorithm comprising the number of user ranking votes to each digital content item and updating the ranking for each digital content item in the set.

26 Claims, 7 Drawing Sheets

| Today | Commercial | Move up/ down |
|---|---|---|
| 1<br>1 yesterday | | |
| 2<br>8 yesterday | | |
| 3<br>2 yesterday | | |
| 4<br>4 yesterday | | |
| 5<br>6 yesterday | | |
| 6<br>5 yesterday | | |
| 7<br>7 yesterday | | |
| 6<br>5 yesterday | Commercial video playback | Puddle<br>Elizabeth Arden<br>Views: 102393 | Move Up<br>Move Down |
| 9<br>8 yesterday | | |
| 10<br>11 yesterday | | |
| 11<br>10 yesterday | | |

| Today | Commercial | Move up/ down | |
|---|---|---|---|
| 1<br>1 yesterday | | Move Up<br>Move Down | |
| 2<br>8 yesterday | | Move Up<br>Move Down | |
| 4<br>4 yesterday | | Move Up<br>Move Down | +1 |
| 5<br>6 yesterday | | Move Up<br>Move Down | +1 |
| 3<br>2 yesterday | Commercial Video Playback | Move Up<br>Move Down | -2 |
| 6<br>5 yesterday | | Move Up<br>Move Down | |
| 7<br>7 yesterday | | Move Up<br>Move Down | |
| 8<br>2 yesterday | | Move Up<br>Move Down | |
| 9<br>8 yesterday | | Move Up<br>Move Down | |
| 10<br>11 yesterday | | Move Up<br>Move Down | |
| 11<br>10 yesterday | | Move Up<br>Move Down | |

Note: Row labeled "3 / 2 yesterday" also shows "Bella Dr. Pepper Views: 102393" in the Commercial column.

Ranking Votes

| Videos | 1st | 2nd | 3rd | 4th | 5th | 6th | 7th | 8th | 9th | 10th | 11th |
|---|---|---|---|---|---|---|---|---|---|---|---|
| The Brad | 5165 | 1444 | 51548 | 151 | 4854 | 13 | 157 | 566 | 778 | 123 | 100 |
| Through The Years | 102 | 1555 | 841 | 135 | 1854 | 948 | 15188 | 158 | 4986 | 158 | 151 |
| Bella | 1525 | 4861 | 158 | 1045 | 10 | 184 | 489 | 789 | 900 | 1005 | 15 |
| Kill? | 158 | 1045 | 10 | 255 | 888 | 102 | 1555 | 841 | 135 | 566 | 778 |
| Tackle | 13 | 157 | 566 | 778 | 123 | 100 | 102 | 1555 | 841 | 135 | 1854 |
| Skydive | 4854 | 13 | 157 | 566 | 778 | 123 | 100 | 10 | 184 | 489 | 789 |
| Before FedEx | 888 | 102 | 1555 | 841 | 135 | 1555 | 841 | 135 | 1854 | 784 | 10 |
| Puddle | 3002 | 1515 | 810 | 163 | 1036 | 100 | 221 | 548 | 135 | 1000 | 126 |
| Crime Deterrent | 5451 | 810 | 900 | 700 | 545 | 105 | 405 | 350 | 150 | 50 | 25 |
| Monkeys | 2005 | 148 | 607 | 504 | 1023 | 857 | 1005 | 350 | 200 | 154 | 52 |
| Swing | 980 | 150 | 135 | 1555 | 841 | 135 | 157 | 566 | 778 | 123 | 100 |

702

704

706

US 7,840,563 B2

COLLECTIVE RANKING OF DIGITAL CONTENT

CROSS REFERENCE TO RELATED APPLICATIONS

This application claims the benefit of U.S. Provisional Application No. 60/888,084, filed Feb. 3, 2007, which is incorporated by reference in its entirety.

BACKGROUND

1. Field of Art

This disclosure generally relates to the field of ranking digital content. Specifically, this disclosure is directed towards allowing users of a web site to establish a collective ranking of digital content such as video.

2. Description of the Related Art

Video hosting websites allow a user to upload videos to the video hosting websites for viewing by other users. Video hosting websites allow users to access the uploaded videos by both searching using keywords and by browsing in categories or channels. Using either approach, a user is presented with a list of the individual videos available from the video hosting website from which the user can choose to view. In conventional video hosting systems, a user can provide feedback on a video. Feedback can include active feedback, such as a video rating of the video on a scale of say one to five "stars" or comments. The video hosting website analyzes the feedback to rank the videos so that users are presented with videos with a high probability of user satisfaction or interest While the conventional methods allow user to rate individual videos, conventional methods do not allow users to rank the videos in a given set of videos. For example, if a user is reviewing a set of twenty videos, the user can only rate them individually, but is unable to rank the videos in the set in an order respective to one another.

Additionally, the conventional methods require the users viewing the video to actively provide feedback that can be used to rank the list of videos. Generally, the sole purpose of the majority of users who view videos is for entertainment purposes so many users do not leave any feedback. Accordingly, a great amount of time is needed to accumulate the needed rating information to accurately rank a list of videos.

SUMMARY

The present invention provides methods and systems for collaborative ranking of a set of digital items such as videos in an online content hosting website. A set of digital content items is provided to users who wish to participate in the collaborative ranking of the set of digital content items. Content providers control which digital content items are represented in the set. The set of digital content can be in the form of a playlist. Alternatively, a playlist can be defined by one or more of the users of the website, or a playlist can be automatically generated based on available information from the website such as the top ten highest rated digital content items or the top ten most viewed digital content items.

In one embodiment, a web server retrieves the set of digital content items from a digital content database to provide to valid users participating in the collaborative ranking of the set of digital content items. Each user is displayed the current ranking of each digital content item in the set and provides ranking feedback for each digital content item representing a vote that associates the digital content item with a particular ranking position. A scoring module tallies all valid votes received from all valid users and calculates a new ranking score for each digital content item in the set. The new ranking scored is used to update the collaborative ranking of the predefined set of digital content.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
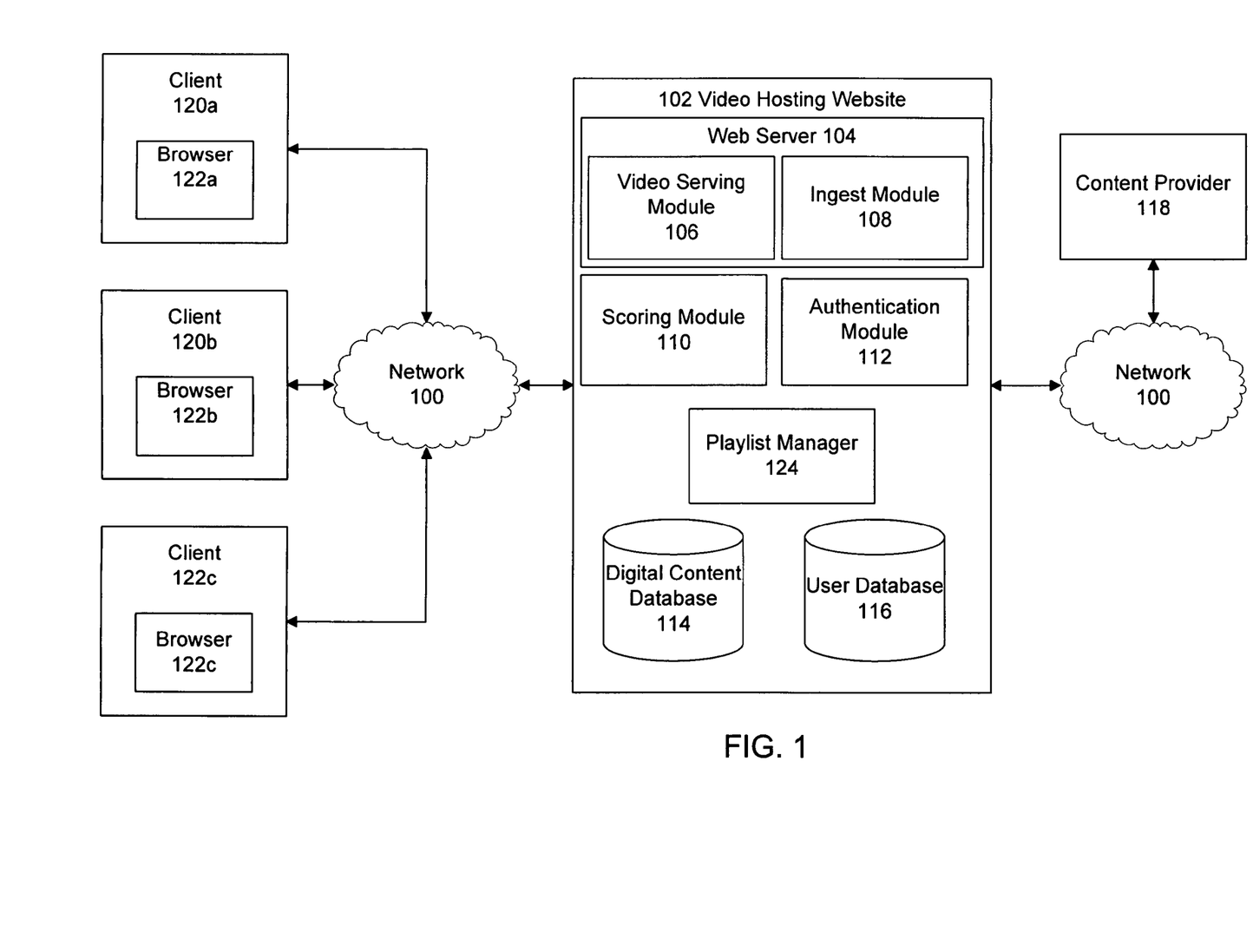
FIG. 1 illustrates a block diagram of the system architecture of one embodiment of the present invention.

Referring now to FIG. 1, there is shown the system architecture of an embodiment of a video hosting website 102 in accordance with one embodiment of the present invention. As shown in FIG. 1, the video hosting website 102 comprises a web server 104, a scoring module 110, an authentication module 112, a playlist manager 124, a digital content database 114 and a user database 116. Many conventional features, such as firewalls, load balancers, application servers, failover servers, site management tools and so forth are not shown so as not to obscure the features of the system. A suitable website 102 for implementation of the system is the YOUTUBE™ website, found at www.youtube.com; other video hosting sites are known as well, and can be adapted to operate according to the teaching disclosed herein. It will be understood that the term "web site" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The server is implemented as server program executing on server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

A client 120 executes a browser 122 and can connect to the web server 104 to view digital content items via a network 100, which is typically the internet, but can also be any network, including but not limited to any combination of a LAN, a MAN, a WAN, a mobile, wired or wireless network, a private network, or a virtual private network. While only three clients 120a, 120b, and 120c and their respective browsers 122a, 122b, and 122c are shown, it is understood that very large numbers (e.g., millions) of clients are supported and can be in communication with the video hosting website 102 at any time. The client 120 may include a variety of different computing devices. Examples of client devices 120 are personal computers, digital assistants, personal digital assistants, cellular phones, smart phones, mobile phones, or laptop computers. As will be obvious to one of ordinary skill in the art, the present invention is not limited to the devices listed above.

The browser 122 can include any application that allows users of client 120 to access web pages on the World Wide Web. Suitable applications are Microsoft Internet Explorer, Netscape Navigator, Mozilla Firefox, Apple Safari or any application adapted to allow access to web pages on the World Wide Web. The browser 122 can also include a video player (e.g., Flash™ from Adobe Systems, Inc.), or any other player adapted for the video file formats used in the video hosting website 102. A user can access a set of videos from the video hosting website 102 by browsing a catalog of videos, conducting searches on keywords, reviewing play lists from other users or the system administrator (e.g., collections of videos forming channels), or viewing videos associated with particular user group (e.g., communities).

The content provider 118 is responsible for providing digital content items to the video hosting website 102 via the network 100. The content provider determines the set of digital content items which will be collaboratively ranked by users of the video hosting website 102 and uploads the digital content items included in the determined set to the web server 104. While only one content provider 118 is shown, it is understood that any number of content providers are supported and can be in communication with the video hosting website 102 at any time.

The uploaded digital content items can include, for example, video, audio or a combination of video and audio. Alternatively, a digital content item may be a still image, such as a JPEG or GIF file or a text file. For purposes of convenience and ease of description of one embodiment, the digital content items will be referred to as "video," "video files," or "video items," but no limitation on the types of digital content items are intended by this terminology.

The web server 104 comprises a video serving module 106 and an ingest module 108. Generally, the web server 104 is responsible for communication between the video hosting website 102 and the client 122 and the content provider 118. The ingest module 108 is responsible for receiving and processing the uploaded videos from the content provider 118. The uploaded videos are processed by the ingest module 108 for storage in the digital content database 114. This processing can include format conversion (transcoding), compression, metadata tagging, and other data processing.

The video serving module 106 is responsible for receiving requests for videos and providing videos to users. Users can search for sets of videos (e.g., playlists) to collaboratively rank based on search criteria such as keywords, tags or other metadata. Each playlist contains videos which were determined to be included in the playlist by the content provider 118. The user queries are provided to the video serving module 106 which retrieves the appropriate set or sets of videos from the digital content database 114 based on the provided search criteria. Alternatively, users can browse a list containing various sets of videos to collaboratively rank. The playlists can be based on categories such as most viewed playlists, sports, animals, or automobiles. For example, the user may browse a list containing various playlists related to commercials and the user may decide to participate in collaboratively ranking a set of videos related to commercials that aired during the Super Bowl to determine the most entertaining Super Bowl commercials. Additionally, users can search for a particular video based on the search criteria discussed above and the video serving module 106 determines every playlist available for collaborative ranking that contains the particular video. Each playlist containing the particular video is presented to the user to decide which set of videos to collaboratively rank.

The video serving module 106 is also responsible for receiving requests for videos from content provider 118 based on the search criteria discussed above and returning the appropriate videos stored in the digital content database 114. The content provider 118 can review the requested videos to determine which videos will be included in the playlist to be collaboratively ranked.

The playlist manager 124 is responsible for creating playlists of videos. The playlist manager 124 tracks which videos are part of certain playlists as indicated by the content provider 118, users, or other sources. The playlist manager 124 communicates with the video serving module 106 to display the appropriate videos to users for collaborative ranking.

The digital content database 114 is used to store the ingested videos. The digital content database 114 stores video content and associated metadata provided by their respective content provider 118. The videos have metadata associated with each file such as a video ID, artist, video title, label, genre, time length, and optionally geo-restrictions that can be used for data collection or content blocking on a geographic basis.

The user database 116 is responsible for maintaining a record of all registered users collaboratively ranking videos in the video hosting website 102. The user database 116 also maintains a record of all registered users who are simply viewing videos in the video hosting website 102. Each individual user of the video hosting website 102 registers account information such as a login name, electronic mail (e-mail) address and password with the video hosting website 102. This account information is stored in the user database 116.

The authentication module 112 is responsible for granting user access to the video hosting website 102. The authentication module 112 verifies the provided account information, as previously discussed, for each user before users are granted full access, allowing the users to contribute to the collaborative ranking of videos. Alternatively, users may access the video hosting website 102 to perform some or all user functions without having to provide account information (e.g., log in) to the authentication module 112. For example, users only interested in viewing videos in the video hosting website 102 are not required to have their account information authenticated.

The scoring module 110 is responsible for receiving ranking votes for each video in each playlist provided by the content providers 118. The scoring module 110 determines a new ranking score for each video in the playlist based on each video's previous ranking score and the current number of ranking votes each video has received. The scoring module 110 uses the ranking score for each video to update the collaborative ranking order of the playlist.

Playlist Creation

Figure 2:
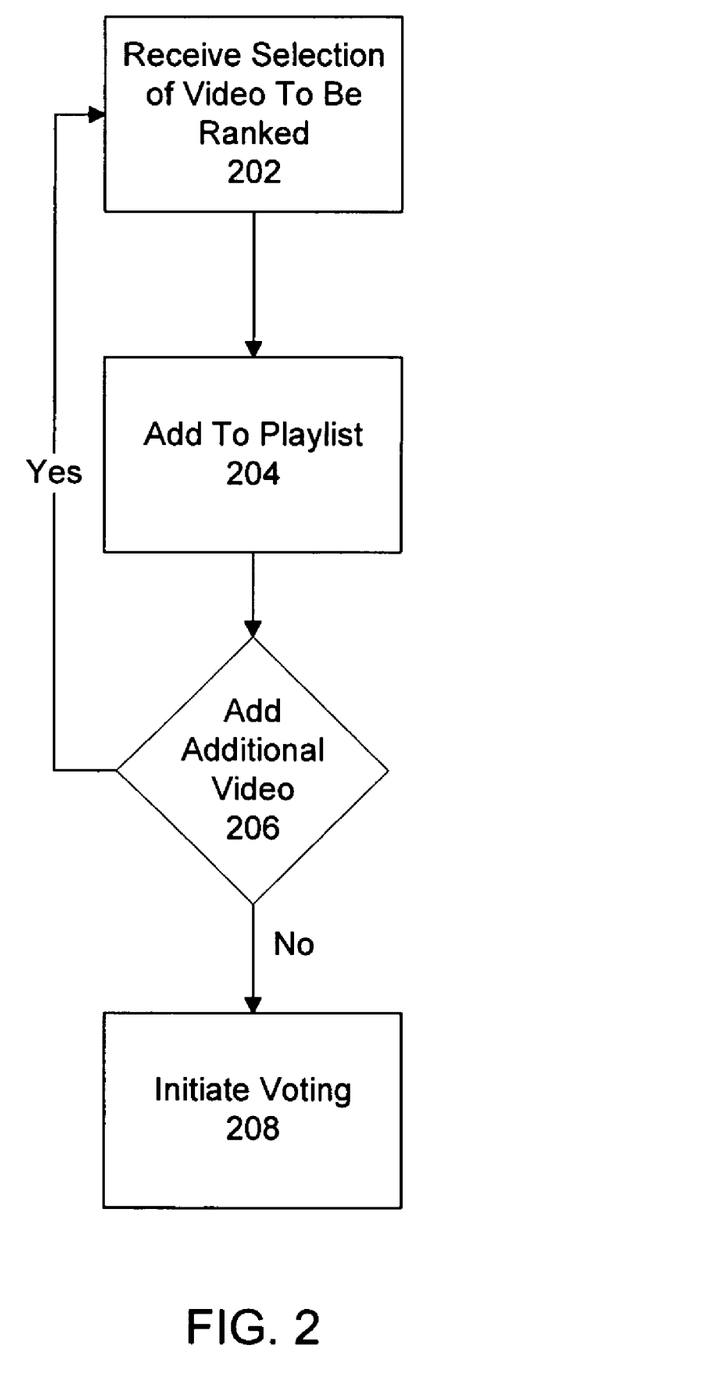
FIG. 2 is a flow diagram illustrating a method for creating a playlist to be collaboratively ranked in accordance with an embodiment of the present invention.

Referring now to FIG. 2, the method for creating a set of digital content items or playlist to be collaboratively ranked by users of the video hosting website 102 is shown. The playlist beneficially provides the content provider 118 a medium to receive ranking information for a particular set of videos. In one embodiment, the content provider 118 compiles the playlist of videos to be collaboratively ranked. This beneficially provides the content provider 118 control over which videos are in the playlist ensuring only appropriate videos are considered. Additionally, playlists can be compiled by users of the video hosting website 102. Users are allowed to create their own playlist of videos which they wish to be collaboratively ranked.

Alternatively, the playlist is compiled collaboratively by a combination of users and/or one or more content providers 118. Collaboration between a combination of users and content providers offer a wealth of information regarding videos which are candidates for collaborative ranking. For example, rather than only having an assessment from the content provider's point of view which Super Bowl commercials were the most entertaining, input from users of the video hosting website 102 who viewed the Super Bowl commercials can be considered to develop the playlist. Accordingly, the digital content items that form part of the playlist to be ranked may be compiled by content providers, users or third parties.

In an alternative embodiment, the playlist is compiled from rating data across some or all of users of the video hosting website 102. For example, a playlist can be created automatically by the video hosting website 102 by compiling the top ten videos for a particular subject or category or from the top ten most viewed videos in the video hosting website 102 to allow users to decide the proper ranking of the videos with respect to the other videos in the playlist. In the context of the present invention for ease of description, it is assumed that a playlist is created by the content provider 118, though the playlist can be created by various sources as previously discussed above.

The content provider 118 searches for videos based on search criteria such as keywords, tags or other metadata. The video serving module 106 retrieves videos matching the entered search criteria from the digital content database 114. The retrieved videos are provided to the content provider 118 for viewing to determine which videos will be included in the playlist for collaborative ranking. Alternatively, if the content provider 118 is not satisfied with the retrieved videos, the content provider 118 can upload a video to the video hosting website 102 which will be included in the playlist. The content provider 118 provides the video to the ingest module 108 which processes the video for storage in the digital content database 114 as previously discussed.

Referring to FIG. 2, after the content provider 118 has determined a video which will be included in the playlist, the playlist manager 124 receives 202 the selection of the video to be ranked in the playlist. The selection can be determined by the playlist manager 124 when the content provider 118 selects a button or icon in the user interface of the video hosting website 102 indicating selection of the video to be included in the playlist for collaborative ranking. After the playlist manager 124 receives the selection, the playlist manager 124 adds 204 the video to the playlist.

The playlist manager 124 may provide a prompt to the content provider 118 if there are additional videos to add to the playlist. If the content provider 118 indicates that there are additional videos to be added, the playlist manager 124 returns to step 202 to receive selection of a video to be added to the playlist. The content provider 118 will then select and add videos to the play list as previously discussed above. The playlist manager 124 keeps track of each video included in all the playlists in the video hosting website 102. The playlist manager 124 communicates with the video serving module 106 to retrieve the appropriate videos from the digital content database 114 for display when a user wishes to collaboratively rank a playlist.

Once the content provider 118 determines that all the required videos have been added to the playlist, the playlist manager 124 initiates 208 voting in the collaborative ranking process. In one embodiment, even if voting has already been initiated for a particular playlist, additional videos can be added to the playlist and videos can be removed from the playlist without disruption of the ranking process. Only the content provider 118 is granted access to modify the playlist to allow control over which videos will be ranked in the playlist. Alternatively, users are also allowed access to modify the playlist to add videos they feel should be included in the playlist for collaborative ranking. In an alternative embodiment, after voting has been initiated the playlist cannot be altered.

In another embodiment, the functionality of the playlist manager 124 is provided by the scoring module 110.

Playlist Ranking

Figure 3:
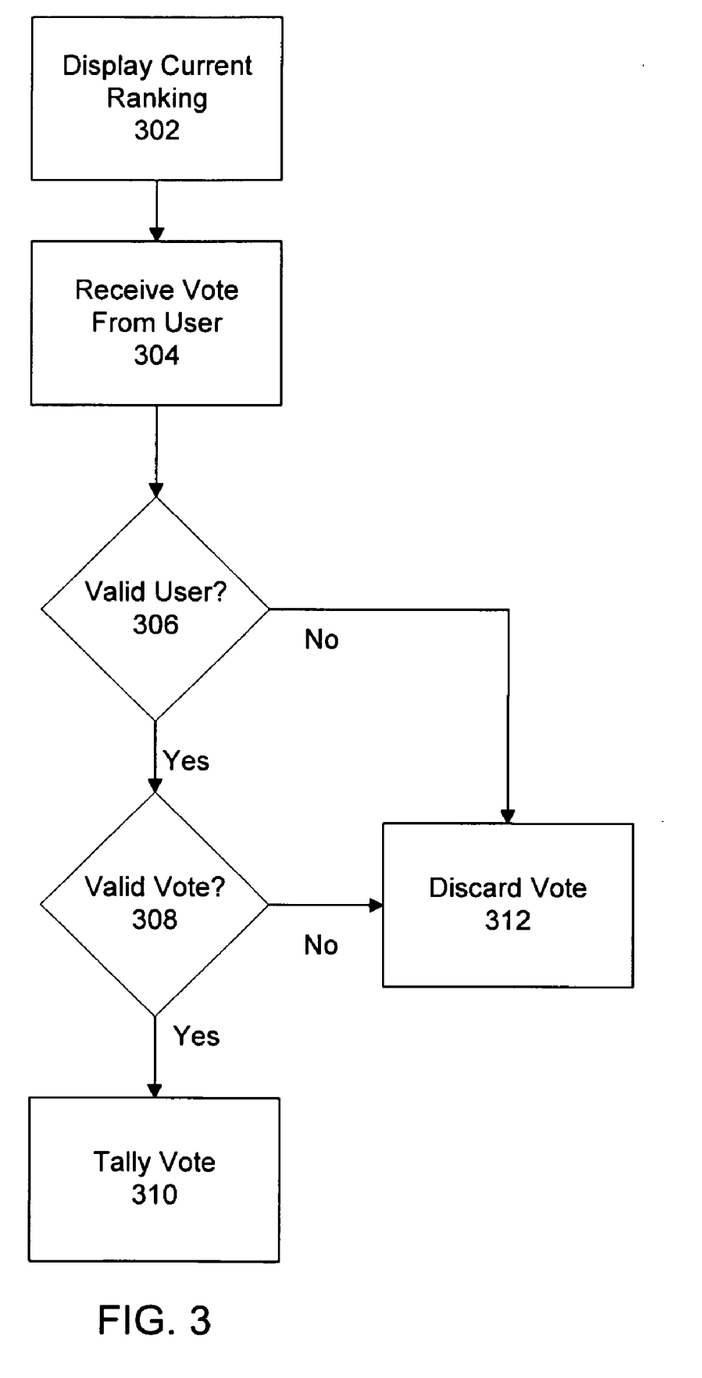
FIG. 3 is a flow diagram illustrating a method for receiving ranking votes from a user in accordance with an embodiment of the present invention.

Now referring to FIG. 3, there is shown a method for receiving rankings of videos in a playlist from a user. Initially, the playlist of videos and their current ranking order is displayed 302 to the users who have accessed the playlist, for example by searching, browsing, or otherwise. Additionally, a playlist may be promoted by being prominently displayed on a home page of the video hosting website such as, www.youtube.com, in order to attract attention. Additionally, playlist statistics are also included. For example, the user may be displayed the number of views the playlist has received from all users on the video hosting website since the playlist's creation. Playlist statistics indicate information regarding the playlist to assist users in determining if the user wishes to participate in the collaborative ranking of the particular playlist.

Figure 4:
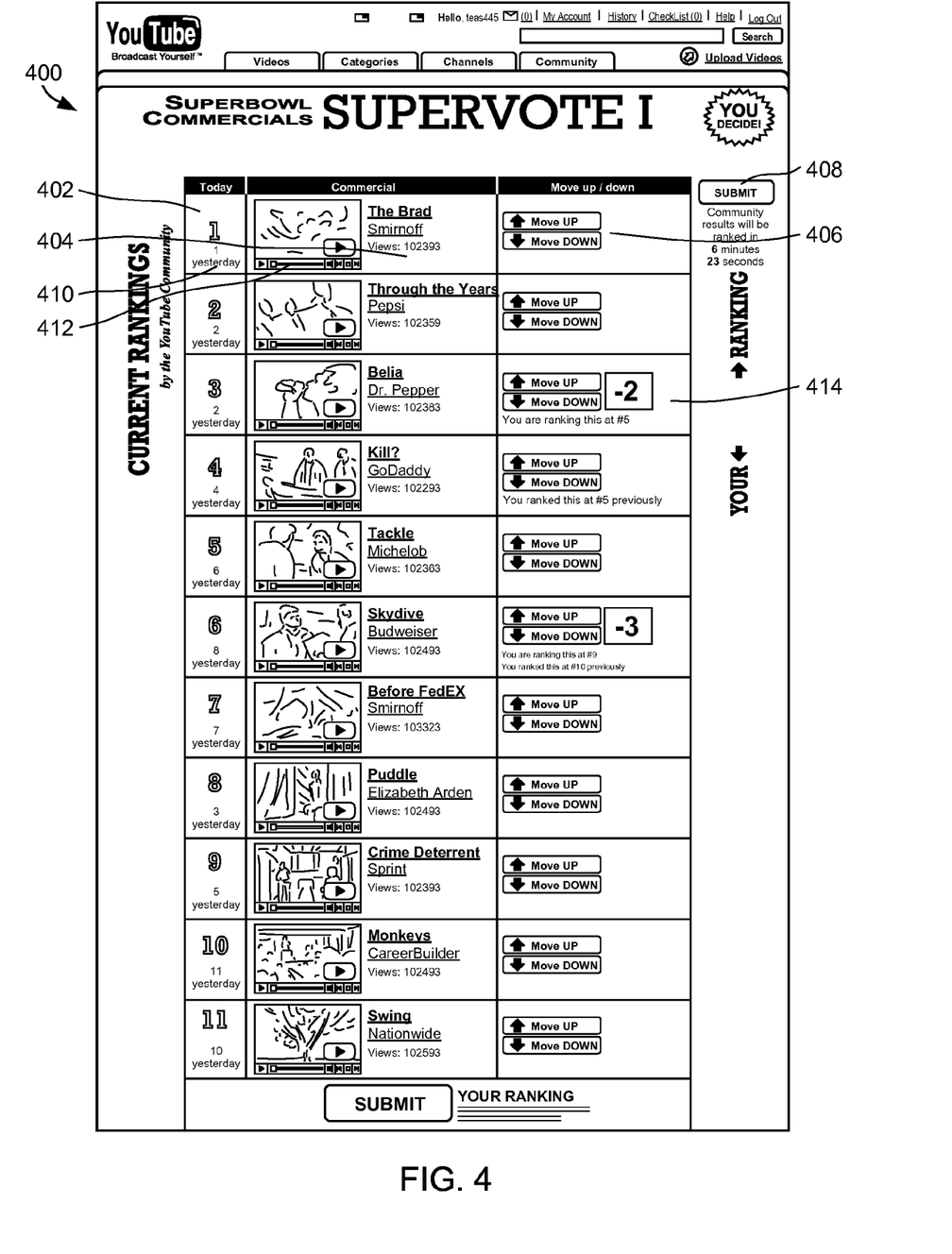
FIG. 4 is an illustration of a user interface for collaborative ranking of a playlist in accordance with an embodiment of the present invention.

Referring now to FIG. 4, there is shown an example of a user interface for displaying a collaborative ranking of videos. In the illustrated case, these videos are 11 television commercials from the Super Bowl from the playlist to be ranked. The videos represented in the playlist correspond to the videos selected in the method describing the playlist creation previously discussed above. The set of commercials are provided in a scrollable list format 400 with one commercial per row. Each row includes a ranking cell 402, a title cell 404, and a voting cell 406. Each element comprised in the row will be described in further detail below.

Ranking cell 402 displays the relative ranking position of each commercial as of the last time the new ranking scores were calculated across all users participating in the collaborative ranking of the given playlist. For example, in FIG. 4, the commercial titled "Puddle" is ranked 8th out of the 11 commercials according to the ranking cell associated with the video. In the illustrated embodiment, the ranking cell 402 also displays the previous ranking position 410 held in the previous ranking period. For example, the commercial "Puddle" was ranked 2nd in the playlist across all users during the ranking period prior to the most recent ranking period. In this example, the ranking period prior to the most recent ranking period was "yesterday." The frequency of ranking periods is further described below. In an alternative embodiment, ranking cell 402 also displays the rank voted for previously by the user viewing the rankings. For example, in the ranking cell associated with the commercial "Puddle," additional text is displayed such as, "You ranked this video number 4." Displaying the previous rank vote made by the user helps the user determine where the video should be ranked in the playlist. The previous rank vote made by the user gives perspective to the user of how high or low the ranking should change since the user's previous rank vote.

The title cell 404 includes information about the commercial such as the commercial's title, producer and the number of views the commercial has received. The title cell 404 also includes a still frame excerpt 412 from the commercial. The still frame excerpt allows the user to view a glimpse of the video in the particular row. Alternatively, the title cell 404 includes a moving frame excerpt from the commercial rather than a still frame excerpt of the commercial. The moving frame excerpt represents a portion of the entire commercial allowing the user to view part of the video. The moving frame excerpt assists in the user providing ranking votes for each commercial as the moving frame excerpt provides an idea (e.g., sneak peak) of what the commercial is about. Additionally, the moving frame excerpt entices the user to view the entire commercial.

Figure 5:
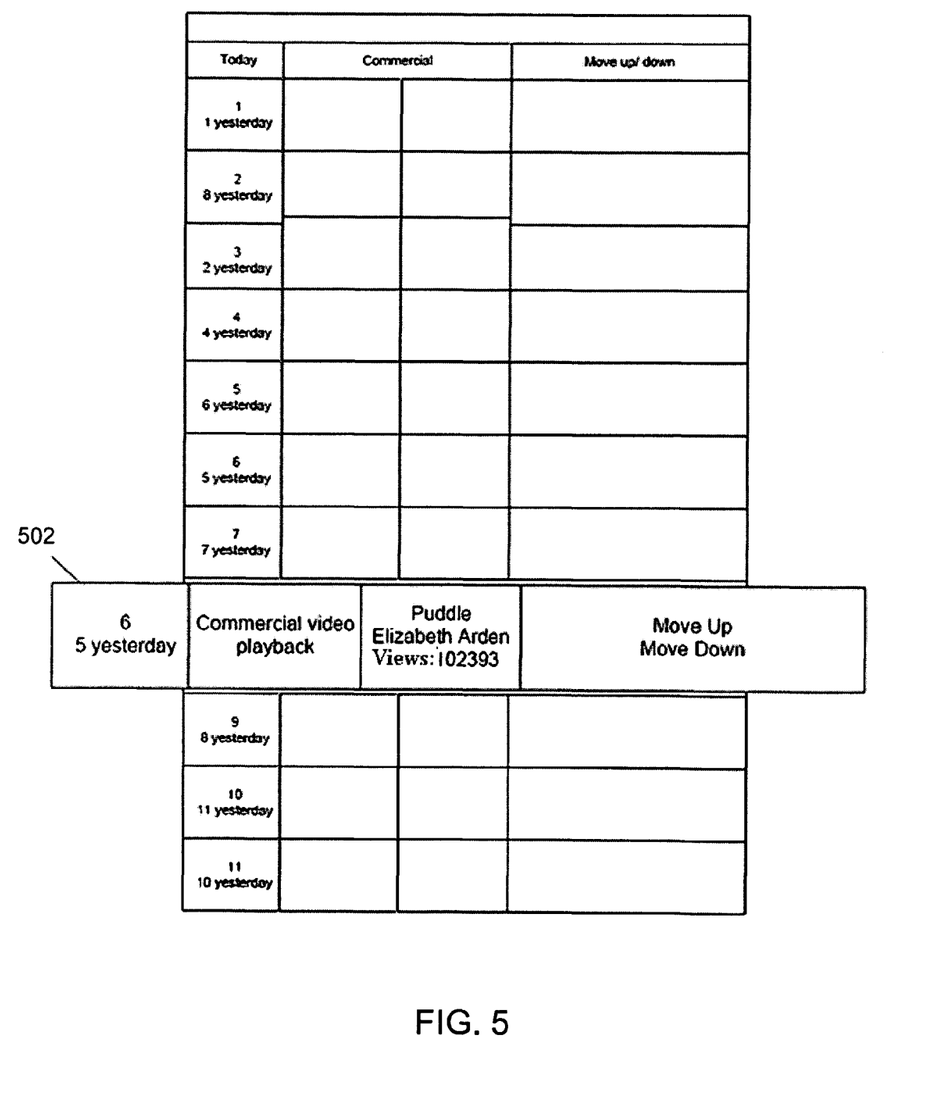
FIG. 5 is an illustration of inline playback of a video from a playlist in accordance with an embodiment of the present invention.

In one embodiment, the user can view the entire commercial by clicking on the still frame excerpt 412 or by clicking on a play control located near the still frame. The commercial is played in a new window. Alternatively, the commercial is played back inline. The entire commercial is played in its associated row (e.g., inline) in the space designated by the still excerpt 412. In another embodiment, selecting a video for playback expands the size of the row in which the commercial is located. Referring to FIG. 5, an example of the larger inline display is illustrated in which the commercial "Puddle" 502 is being played. The row is displayed larger relative to the other rows allowing the user to see a larger view of the contents in the row associated with the video "Puddle." Playback of the commercial proceeds in this larger format. After playback has finished, the row size is returned to its former size. In an alternative embodiment, the commercial is played back in full screen mode occupying the entire viewing screen of the user. By viewing the commercials in their entirety, users provide the most accurate representation of each video ranking position relative to the other commercials in the playlist because the users have personally viewed each commercial. Viewing each video in the playlist aids in the determination of which commercial is the most enjoyable.

Returning to the embodiment of FIG. 4, a user can specify ranking positions for each commercial by choosing the "move up" and "move down" buttons found in voting cell 406 associated with each video. For example, the commercial "Bella" is currently ranked at number 3 in the playlist. The user has utilized the "move down" button to lower the ranking of the video in the playlist by two positions. The voting position element 414 displays the number of positions indicated by the user that the commercial will be moved either up or down. Accordingly, in the example, the user is specifying that the commercial "Bella" is ranked at position 5 in the playlist. Additionally, in the example, the user has noted that the commercial "Skydive" will move down three positions from number 6 and will be ranked at number 9. Alternatively, each row in the playlist representing a commercial is a draggable row. A user can specify ranking positions for each commercial by selecting the ranking cell 402 of any of the commercials and positioning the ranking cell in the appropriate ranking positing utilizing for example a mouse. Generally, the user would drag and drop the commercial into the appropriate ranking position that the user believes a specific commercial in the playlist should be ranked among the other commercials. The drag and drop feature can be utilized rather than the "move up" and "move down" buttons, as described above, in order to rank the commercials in the playlist.

Figure 6:
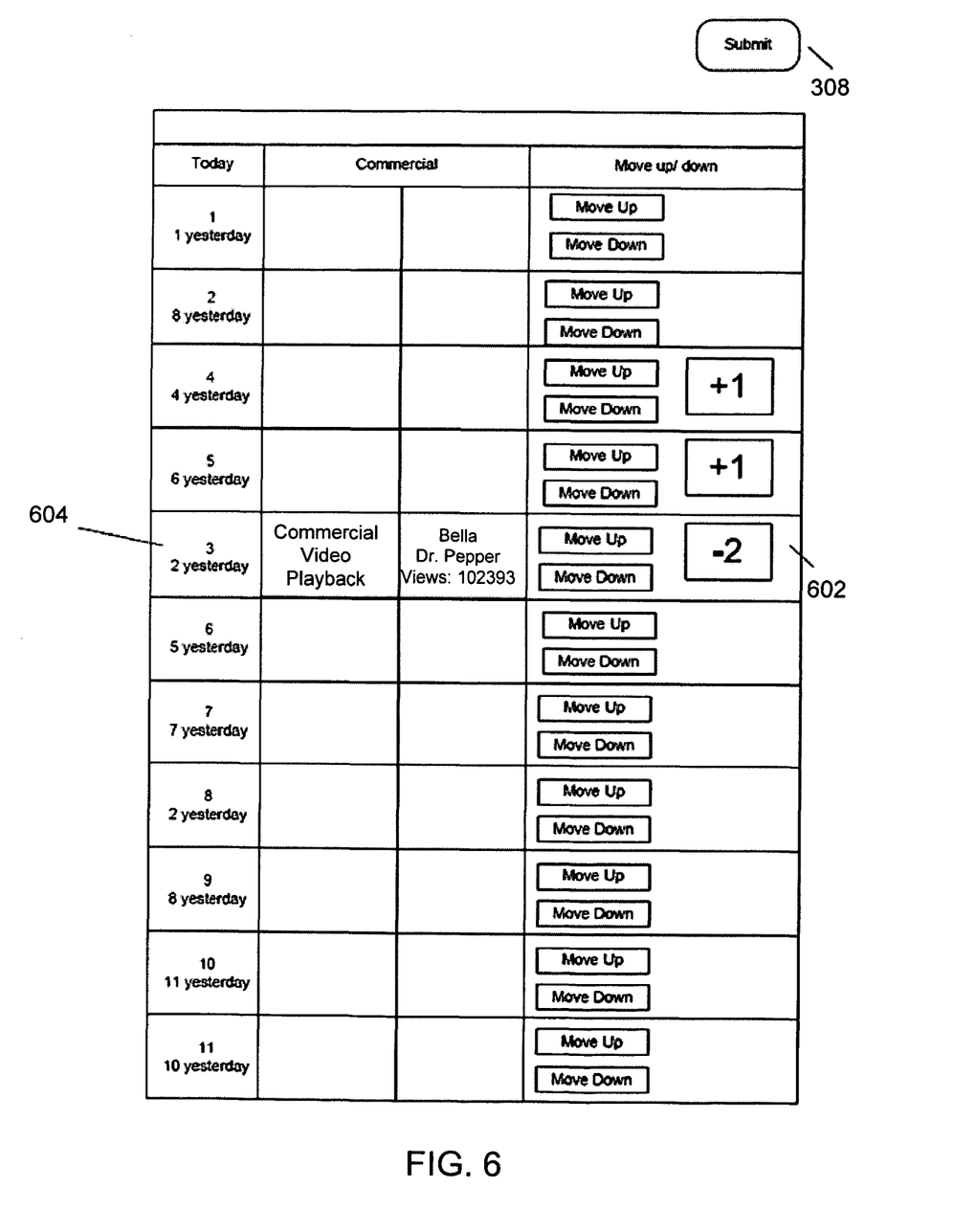
FIG. 6 is an illustration of a user interface confirmation screen for collaborative ranking of a playlist in accordance with an embodiment of the present invention.

Prior to submitting the results indicating the user's ranking of the videos in the playlist, the user is preferably given an opportunity to review the indicated rankings. This allows the user to confirm that the indicated ranking positions represent an accurate view of the appropriate ranking positions for each video as determined by the user. FIG. 6 illustrates a user interface confirmation screen for collaborative ranking of a playlist. As illustrated in FIG. 6, commercial "Bella" has dropped down two positions (e.g., −2) in rank from its original rank (e.g., position 3) as indicated by the voting position element in cell 602. "Bella" is now in position number 5 in the playlist. As a result of "Bella" dropping down to a lower rank position, the two commercials formerly in positions 4 and 5 gain rank as indicating by a "+1" in their respective voting cells. The video formerly in position 4 is now located in position 3 and the video formerly in position 5 is now located in position 4.

In one embodiment, the ranking cell 604 continues to display the most recent ranking of the video indicating a position 3 in the case of commercial "Bella," even though the commercial is located in position 5. This allows the user to view the commercials current ranking across all users participating in the collaborative ranking of the playlist relative to the indicated ranking given by the user. Once the user is satisfied with the ranking choices, the user can submit the ranking by pressing the submit button 308.

As can be appreciated from this example, the user is able to reorder (rank) the videos as desired. This provides the user with a richer experience in terms of being able to judge the videos with respect to each other, as compared with conventional systems as described above in which the user can merely rate individual videos. The ability to rank the videos allows the user to make comparative value judgments of the videos, which collectively (i.e., across the user population) provide a more accurate overall assessment of the relative merits of the videos in the playlist, than would otherwise come from individual ratings as conventionally practiced.

Updating the Ranking Order

Referring back to the embodiment of FIG. 3, once the user has submitted the ranking votes for each commercial, the scoring module 110 receives the votes 304 from the user. In one embodiment, only users who are registered with the video hosting website 102 will have their votes counted in the collaborative ranking of the playlist. This prevents vote fraud by ensuring that only one vote per account is submitted. Accordingly, the authentication module 112 confirms 306 that the user has provided account information matching account information stored in the user database 116 and is therefore a valid user. If the authentication module 112 does not locate the provided account information in the user database 116, the ranking votes provided by the user are discarded 312.

If the authentication module 112 confirms that the provided account information is located in the user database 116, the authentication module 112 determines if the ranking votes provided by the user are valid 308. Valid votes are determined based on the time when the user last submitted ranking votes. Ranking votes are only valid when submitted during the proper voting period. For example, the system administrator of the video hosting website 102 may determine that each user can only cast one vote per day, one vote per hour, etc. Only accepting ranking votes during the proper voting period ensures that a user does not submit a large number of votes within the voting period and prevents the new collaborative ranking of the playlist, as further discussed below, to be influenced by an individual user. The authentication module 112 determines if the vote is valid by comparing the time stamp associated with the ranking vote submission for the entire playlist and the time stamp associated with the previous ranking vote submission. Alternatively, the authentication module 112 can determine if a vote is valid by checking for a cookie on the client browser 122 indicating when the last ranking votes were cast by the user. If the authentication module 112 determines that the vote was cast outside of the proper voting period, the vote is discarded 312. If the authentication module 112 determines that the vote is valid then the vote is accepted and tallied 310.

Figure 7:
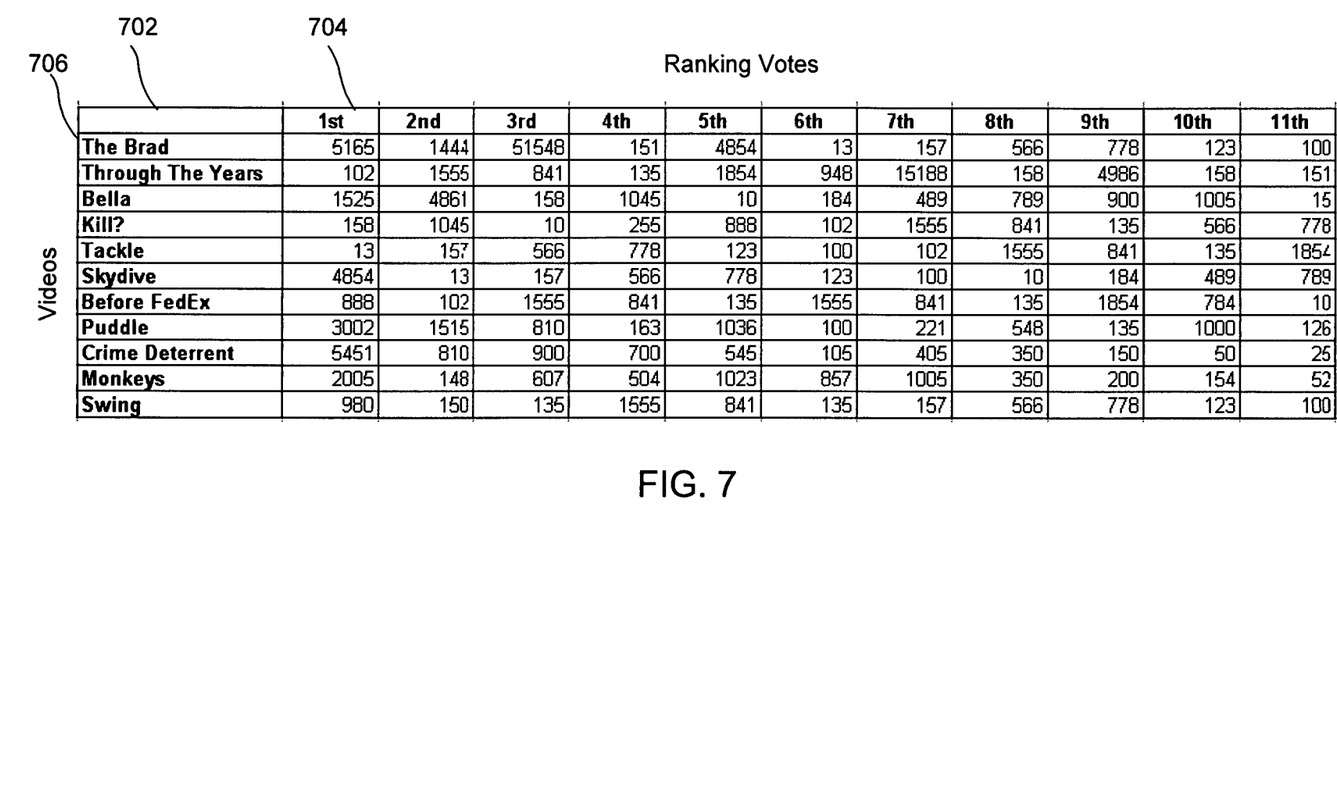
FIG. 7 is a chart illustrating tallied votes for each video in a playlist in accordance with an embodiment of the present invention.

The scoring module 110 tallies 310 all valid votes received from all valid users to determine the amount of ranking votes each video in the playlist received for a particular ranking position. The amount of ranking votes each video received will be used when calculating new ranking scores for each commercial as further described below. Referring to FIG. 7, there is shown a table stored in memory illustrating the tallied valid votes received from all valid users. Column 702 represents the videos in the playlist that are being collaboratively ranked. Each row 706 represents a video in the playlist with its associated title. Column 704 represents the number of votes received for the video of that particular row with the ranking position of the column. For example, row 706 is associated with the commercial "The Brad." Column 704 is representative of votes associated with $1^{st}$ place. The intersection of row 706 and column 704 illustrates that the commercial "The Brad" received 5,165 votes for $1^{st}$ place. The received votes for each video and the possible positions within the playlist are tallied until each video and the possible ranking positions for each video are accounted for. The new ranking scores for each video are then calculated.

In one embodiment, determining the new collaborative ranking for the playlist occurs automatically after all the new ranking scores for each video in the playlist is calculated. In one embodiment, given a set of n videos, a score is assigned to each video in the playlist. In one embodiment, the following variables are used in reference to the equation representative of the calculation used to determine the ranking score for each video found below:

NRS=New Ranking Score
PS=Previous Score
n=total number of videos in the playlist
V1=Votes For First Place
V2=Votes For Second Place
V3=Votes For Third Place
Vn=Votes for n Place
K=½
W=2

The relationships of these variables to each other in an exemplary embodiment is represented by the equation as follows:

$$NRS=(K \cdot PS)+(Wn \cdot (V1))+((Wn-1) \cdot (V2))+((Wn-2) \cdot (V3))+ \ldots +((n+1) \cdot (Vn))$$

In the above equation K and W are weights set to ½ and 2 respectively. These weights may be represented by other values which affect the weighting of the previous score and the weighting for the number of votes received for each ranking position as decided by the system administrator of the video hosting website 102. Those of skill in the art will appreciate that many other scoring algorithms can be used depending on whether and how much decay of earlier scores is desired and how sensitive the system administrator of video hosting website 102 would like a particular video's ranking to be responsive to each received vote.

The calculation of the new ranking score for each video by the scoring module 110 represents a new ranking period and can be performed as frequently or infrequently as desired by the system administrator of the video hosting website 102. For example, the new ranking score for each video in the playlist is calculated every hour, daily, or weekly. Any suitable time interval for the ranking period can be utilized to determine the frequency in which the new ranking scores are calculated. Note that the calculation of new ranking scores and the valid voting periods need not coincide. For example, the new ranking score can be calculated to reorder the videos in the playlist every hour, but a user may vote only once every two hours. As will be apparent to those of skill in the art, various combinations of ranking periods and voting periods may be employed.

After the scores for each video in the playlist is calculated, the videos in the playlist will be re-ranked according to their score. The video in the playlist with the highest score will be ranked number 1, the video with the second highest score will be ranked number 2 and so on until each video in the playlist is ranked. The user interface in FIG. 4 is updated to reflect the new collaborative ranking of the playlist.

Upon reading this disclosure, those of skill in the art will appreciate that though the disclosure above pertains to collaborative ranking of sets of videos, the teachings disclosed can be applied to any digital content item such as audio, text, photographs or images. The features described herein beneficially provide a system and method to effectively rank a set of digital content items through a collaborative effort from users of a video hosting website. Collaborative ranking of digital content items allows content providers to quickly and accurately receive ranking information regarding the set of digital content items.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for collaboratively ranking a set of digital content items through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method for determining a ranking for a set of digital content items in a digital content hosting website, the method comprising:
   storing a ranked set of digital content items, the ranked set describing a current ranking position for each digital content item in the set;
   providing the ranked set of digital content items to a plurality of users;
   for each digital content item in the ranked set:
      receiving from one or more of the plurality of users a ranking vote, the ranking vote for the digital content item indicative of a change in the ranking position for the digital content item in the set, the change in the ranking position moving the digital content item to another position above or below one of the other ranked digital content items in the ranked set;
      determining a new ranking score for each digital content item in the ranked set based at least on a current ranking score for the digital content item and the ranking votes received for the digital content item; and
      updating the ranking position for each digital content item in the set based on the new ranking score for the digital content item to create an updated ranking for the ranked set of digital content items.

2. The computer implemented method of claim 1 wherein ranking votes are votes for a digital content item and a corresponding ranking position in the ranked set.

3. The computer implemented method of claim 1 further comprising:
   for each of the received ranking votes associated with a user,
      determining if the user associated with each of the received ranking votes is a valid user; and
      determining if the received ranking votes associated with the user are valid.

4. The computer implemented method of claim 3, wherein determining if the received ranking votes are valid comprises determining that each of the plurality of ranking votes were submitted within the proper voting period for each user.

5. The computer implemented method of claim 3, wherein determining if the user associated with each of the received ranking votes is a valid user comprises determining if the user registered account information with the digital content hosting website.

6. The computer implemented method of claim 1 further comprising tallying the ranking votes for each digital content item, wherein tallying the ranking votes comprises determining for each digital content item the number of ranking votes that were received for a particular ranking position in the ranked set.

7. The computer implemented of claim 1, wherein the new ranking score is further based on the number of digital content items in the set and the number of ranking votes a digital content item received for each possible ranking position in the set.

8. The computer implemented method of claim 1, wherein determining a new ranking score for each digital content item occurs based at least on a time interval.

9. The computer implemented method of claim 1 further comprising displaying content of each of the digital content items.

10. The computer implemented method of claim 1 further comprising displaying a confirmation page indicating ranking positions of each digital content item according to the updated ranking.

11. The computer implemented method of claim 1, wherein the receiving from one or more of the plurality of users the ranking vote for each digital content item in the ranked set comprises receiving from at least one of the plurality of users a ranking vote indicated by the user by dragging a row corresponding to one of the digital content items to another position in the set above or below a current position of the row in the ranked set.

12. A user interface for a digital content hosting web site for displaying a set of digital content items to be collaboratively ranked, the user interface comprising:
   a plurality of digital content rows, each digital content row comprising:
      a ranking cell displaying a relative ranking position of the digital content item associated with the row;
      a region adapted to display a digital content item;
      a title cell including information about the digital content item, the information comprising the digital content item's title, a producer or a number of views the digital content item has received;
      a first button adapted to increase a ranking position of the digital content item;
      a second button adapted to decrease the ranking position of the digital content item; and
      an element adapted to display the numerical change of ranking positions for the digital content.

13. The user interface of claim 12, wherein the ranking cell further displays the previous ranking position of the digital content item.

14. The user interface of claim 12, wherein the ranking cell further displays the previous ranking position submitted by a user viewing the user interface.

15. The user interface of claim 12, wherein the region adapted to display the digital content item is further adapted to display a larger inline display of the row.

16. A digital content hosting system for determining a ranking of a set of digital content items, the digital content hosting system comprising:
 a digital content database configured for storing a ranked set of digital content items, the ranked set describing a current ranking position for each digital content item in the set;
 a user database configured for storing registered users of the digital content hosting website;
 a scoring module configured for:
  for each digital content item in the ranked set:
   receiving from one or more of the plurality of users a ranking vote for each digital content item in the ranked set, the ranking vote for the digital content item indicative of a change in the ranking position for the digital content item in the set, the change in the ranking position moving the digital content item to another position above or below one of the other ranked digital content items in the ranked set;
  determining a new ranking score for each digital content item in the ranked set based at least on a current ranking score for the digital content item and the ranking votes received for the digital content item; and
  updating the ranking position for each digital content item in the set based on the new ranking score for the digital content item to create an updated ranking for the ranked set of digital content items;
 and an authentication module adapted to determine valid registered users and valid ranking votes.

17. A computer program product for determining a ranking for a set of digital content items in a digital content hosting website, comprising a computer-readable medium containing computer program code for controlling a processor to perform a method comprising:
 storing a ranked set of digital content items, the ranked set describing a current ranking position for each digital content item in the set;
 providing the ranked set of digital content items to a plurality of users;
 for each digital content item in the ranked set:
  receiving from one or more of the plurality of users a ranking vote for each digital content item in the ranked set, the ranking vote for the digital content item indicative of a change in the ranking position for the digital content item in the set, the change in the ranking position moving the digital content item to another position above or below one of the other ranked digital content items in the ranked set;
 determining a new ranking score for each digital content item in the ranked set based at least on a current ranking score for the digital content item and the ranking votes received for the digital content item; and
 updating the ranking position for each digital content item in the set based on the new ranking score for the digital content item to create an updated ranking for the ranked set of digital content items.

18. The computer program product of claim 17 wherein ranking votes are votes for a digital content item and a corresponding ranking position in the ranked set.

19. The computer program product of claim 17, the method further comprising:
 for each of the received ranking votes associated with a user,
  determining if the user associated with each of the received ranking votes is a valid user; and
  determining if the received ranking votes associated with the user are valid.

20. The computer program product of claim 19, wherein determining if the received ranking votes are valid comprises determining that each of the plurality of ranking votes were submitted within the proper voting period for each user.

21. The computer program product of claim 19, wherein determining if the user associated with each of the received ranking votes is a valid user comprises determining if the user registered account information with the digital content hosting website.

22. The computer program product of claim 17, the method further comprising tallying the ranking votes for each digital content item, wherein tallying the ranking votes comprises determining for each digital content item the number of ranking votes that were received for a particular ranking position in the ranked set.

23. The computer program product of claim 17, wherein the new ranking score is further based on the number of digital content items in the set and the number of ranking votes a digital content item received for each possible ranking position in the set.

24. The computer program product of claim 17, wherein determining a new ranking score for each digital content item occurs based at least on a time interval.

25. The computer program product of claim 17, the method further comprising displaying a confirmation page indicating ranking positions of each digital content item according to the updated ranking.

26. A computer program product for producing a user interface for a digital content hosting web site for displaying a set of digital content items to be collaboratively ranked, the user interface comprising:
 a plurality of digital content rows, each digital content row comprising:
  a ranking cell displaying a relative ranking position of the digital content item associated with the row;
  a region adapted to display a digital content item;
  a title cell including information about the digital content item, the information comprising the digital content item's title, a producer or a number of views the digital content item has received;
  a first button adapted to increase a ranking position of the digital content item;
  a second button adapted to decrease the ranking position of the digital content item; and
  an element adapted to display the numerical change of ranking positions for the digital content.

* * * * *